(12) United States Patent
Ayers et al.

(10) Patent No.: US 9,375,766 B2
(45) Date of Patent: Jun. 28, 2016

(54) NEAR-SURFACE WELLHEAD FOR EXTRACTING NATURAL GAS

(71) Applicant: WATERSHED GEOSYNTHETICS LLC, Alpharetta, GA (US)

(72) Inventors: Michael R. Ayers, Alpharetta, GA (US); Delaney Lewis, West Monroe, LA (US); Jose Urrutia, Suwanee, GA (US)

(*) Notice: Subject to any disclaimer, the term of this patent is extended or adjusted under 35 U.S.C. 154(b) by 263 days.

(21) Appl. No.: 13/949,830

(22) Filed: Jul. 24, 2013

(65) Prior Publication Data

US 2014/0030023 A1 Jan. 30, 2014

Related U.S. Application Data

(60) Provisional application No. 61/675,066, filed on Jul. 24, 2012.

(51) Int. Cl.
*B09C 1/00* (2006.01)
*B09B 1/00* (2006.01)

(52) U.S. Cl.
CPC ............... *B09B 1/006* (2013.01); *Y02W 30/35* (2015.05)

(58) Field of Classification Search
CPC ...... B09C 1/005; B09C 1/00; B09C 2101/00; B09B 1/004; Y02W 30/30; Y02W 30/35; Y02W 30/32
USPC .......................................... 405/128.1–129.85
See application file for complete search history.

(56) References Cited

U.S. PATENT DOCUMENTS

| 3,593,478 A | 7/1971 | Mason |
| 3,941,556 A | 3/1976 | Pallagi |

(Continued)

FOREIGN PATENT DOCUMENTS

| EP | 2361698 A1 | 8/2011 |
| GB | 589815 | 7/1947 |

(Continued)

OTHER PUBLICATIONS

International Search Report and The Written Opinion of the International Searching Authority; for International Application No. PCT/US14/26065; Aug. 11, 2014; 12 pages; International Searching Authority/United States, Alexandria, US.

(Continued)

*Primary Examiner* — John Kreck
*Assistant Examiner* — Patrick Lambe
(74) *Attorney, Agent, or Firm* — Gardner, Gross, Greenwald & Villanueva, P.C.

(57) ABSTRACT

A near-surface wellhead for extracting sub-surface gas from beneath a geomembrane includes a plenum defining an enclosure with an upper portion. A conduit extends upwardly from the upper portion of the plenum, the conduit communicating with the interior volume of the plenum and has external threads for receiving a threaded nut thereon. The conduit is adapted and provided for extending through an aperture in the geomembrane for withdrawing sub-surface gas from within the interior volume of the plenum and through the geomembrane. A gasket having an opening formed therein is slipped over the conduit and above the geomembrane so that the geomembrane is sandwiched between the gasket and the upper portion of the plenum. A threaded nut is fitted to the conduit and above the gasket for securing the gasket against the geomembrane, thereby sealing the geomembrane to the upper portion of the plenum.

20 Claims, 6 Drawing Sheets

(56) References Cited

U.S. PATENT DOCUMENTS

| | | |
|---|---|---|
| 4,483,641 A | 11/1984 | Stoll |
| 4,487,054 A | 12/1984 | Zison |
| 4,518,399 A | 5/1985 | Croskell et al. |
| 5,221,159 A | 6/1993 | Billings et al. |
| 5,259,697 A | 11/1993 | Allen et al. |
| 5,588,490 A | 12/1996 | Suthersan et al. |
| 5,893,680 A * | 4/1999 | Lowry et al. ............... 405/128.2 |
| 6,305,473 B1 | 10/2001 | Peramaki |
| 6,742,962 B2 | 6/2004 | Hater et al. |
| 6,749,368 B2 | 6/2004 | Ankeny et al. |
| 6,910,829 B2 | 6/2005 | Nickelson et al. |
| 7,153,061 B2 | 12/2006 | Nickelson et al. |
| 7,198,433 B2 | 4/2007 | Augenstein et al. |
| 7,309,431 B2 | 12/2007 | Degarie |
| 7,448,828 B2 | 11/2008 | Augenstein et al. |
| 7,722,289 B2 | 5/2010 | Leone |
| 7,972,082 B2 | 7/2011 | Augenstein et al. |
| 8,002,498 B2 | 8/2011 | Leone et al. |
| 8,047,276 B2 | 11/2011 | Stamoulis |
| 8,168,121 B2 | 5/2012 | Elkins |
| 8,192,111 B2 | 6/2012 | Zimmel |
| 8,398,335 B2 | 3/2013 | Stamoulis |
| 2003/0008381 A1 | 1/2003 | Augenstein |
| 2003/0111122 A1 | 6/2003 | Horton |
| 2004/0103886 A1 | 6/2004 | Benjey |
| 2004/0112607 A1 | 6/2004 | Beckhardt |
| 2005/0082830 A1 | 4/2005 | Voelker |
| 2005/0236042 A1 | 10/2005 | Hansen et al. |
| 2006/0034664 A1 | 2/2006 | Augenstein |
| 2008/0017558 A1 | 1/2008 | Pollock et al. |
| 2009/0136298 A1 | 5/2009 | Augenstein et al. |
| 2011/0302876 A1 | 12/2011 | Giffin |

FOREIGN PATENT DOCUMENTS

| | | |
|---|---|---|
| JP | 11216440 A | 8/1999 |
| JP | 2003340392 A | 12/2003 |
| WO | 2007/103153 A3 | 9/2007 |
| WO | 2008/061294 A1 | 5/2008 |
| WO | 2011148139 A3 | 11/2012 |

OTHER PUBLICATIONS

Barometrically Enhanced Remediation Technology (BERT); Innovative Technology Summary Report, Mar. 2000, 28 pages, Prepared for U.S. Department of Energy, Office of Environmental Management, Office of Science and Technology, US.

International Search Report and The Written Opinion of the International Searching Authority; for International Application No. PCT/US14/22991; Jul. 3, 2014; 8 pages; International Searching Authority/United States, Alexandria, US.

* cited by examiner

NEAR-SURFACE WELLHEAD FOR EXTRACTING NATURAL GAS

CROSS REFERENCE TO RELATED APPLICATION

This application claims the priority benefit of U.S. Provisional Patent Application Ser. No. 61/675,066, filed Jul. 24, 2012, which is hereby incorporated herein by reference.

BACKGROUND

As described in published U.S. Patent Application Number 20060034664, conventional gas extraction wells at landfills often involve deep wells attached to a network of pipes and a gas pump (blower) that applies vacuum to extract the gas from the stored waste. The profile of surface emission flux is recognized to lead to potential for some emissions away from the wells under most circumstances. Note also that there is almost always entrainment of gas, whether LFG or atmospheric air, through the surface area most proximate to deep collection. Both LFG emission far from wells, and air entrainment proximate to subsurface collection, are well recognized as deleterious to collection efficiency. A "tradeoff" exists between extracting or "pulling" at too high a flow rate and entraining excessive atmospheric air, and pulling too little and recovering less LFG. This poses one dilemma of conventional extraction.

A prior art arrangement according to the above published patent application is shown in FIG. 1. Landfill 1 containing waste 2 generates biogas (biogas flows shown by the arrows). Biogas is collected and extracted through well 3. The well 3 includes a gas-collecting well screen 16 and a gas-impermeable conduit 17 linking the well screen to the surface to draw biogas from the wellhead to the surface. Overlaying the majority of the waste 2 is a gas-permeable layer 5. The term "wellhead" refers to a portion of the gas-extraction well where gas can be extracted therefrom. The well often includes a section of pipe having slots or other gas-flow apertures cut in it, referred to as a "well screen". Often, the well screen is also surrounded with gravel. The gas-permeable layer is typically composed of a conductive porous matrix with gas flow paths. Often it is composed of rigid or semi-rigid particles of a large enough size to leave a significant void volume between particles. For instance, the gas-permeable layer may contain sand, gravel, wood chips, or shredded tires. Above the gas-permeable layer is a gas-containment layer 7. Biogas that rises from the landfill reaches the gas-permeable layer where it is trapped by the overlying gas-containment layer 7. The biogas migrates horizontally in the gas-permeable layer until it comes close to a well. Gas extraction from the well creates a vacuum that draws gas into the well. This vacuum draws biogas from the overlying gas-permeable layer down through the waste mass of the landfill to reach the well. The area immediately beneath the gas-permeable high conductivity layer 5 through which a substantial fraction of the biogas from the gas-permeable layer passes as it travels to the gas-collection wellhead is the entrainment zone 9. On its passage through the waste 2, the gas from the gas-permeable layer mixes with biogas produced in the waste mass that has not gone through the gas-permeable layer. This helps to give a consistent content to the biogas that is withdrawn from the well. If gas is withdrawn directly from the gas-permeable conductive layer 5 (e.g., through conduit 8), the gas composition will vary more dramatically over time, sometimes containing a high air content and sometimes not. It is sometimes desirable to place an even more impermeable layer, such as geomembrane 15, directly over the zone of entrainment of gas from the permeable layer that is created by the deep well. Moreover, sometimes the entire landfill is covered with such a membrane.

FIG. 2 shows another prior art arrangement, this time showing a more shallow wellhead 26 used to withdraw near-surface or sub-surface gas from beneath a membrane M capping a waste W. The wellhead 26 is attached to an aboveground conduit C by way of a vertical pipe. Where the pipe extends through the membrane M, such is prone to gas leakage out and/or air leakage in (depending on the relative pressures in the waste W and the atmosphere). To address this, it has been known in the prior art to install a polymer boot B which typically is bonded (welded or glued) to the membrane M and bonded or clamped to the pipe P. Unfortunately, such boots are rather prone to leakage and the seal provided thereby is less than ideal.

Accordingly, it can be seen that there exists a need for a better way for extracting sub-surface gas from near the surface of landfills. It is to the provision of solutions to this and other problems that the present invention is primarily directed.

SUMMARY OF THE INVENTION

In a first example form the present invention comprises a near-surface wellhead for extracting sub-surface gas from beneath a geomembrane. The wellhead includes a plenum for drawing in sub-surface gas, and the plenum includes an enclosure with a substantially flat upper portion and defines an interior volume. A conduit is rigidly connected to and extends upwardly from the substantially flat portion of the plenum, the conduit communicating with the interior volume of the plenum and has external threads for receiving a threaded nut thereon. The conduit is adapted and provided for extending through an aperture in the geomembrane for withdrawing sub-surface gas from within the interior volume of the plenum and through the geomembrane. A gasket having an opening formed therein is slipped over the conduit and above the geomembrane so that the geomembrane is sandwiched between the gasket and the substantially flat upper portion of the plenum. A threaded nut is fitted over the external threads of the conduit and above the gasket for securing the gasket against the geomembrane, thereby sealing the geomembrane to the substantially flat upper portion of the plenum.

Optionally, a substantially flat washer is positioned between the threaded nut and the gasket to avoid galling the gasket as the nut is tightened.

In one example form, the plenum is generally box-like and has perforations formed therein for admitting sub-surface gas.

Optionally, the conduit rigidly connected to and extending upwardly from the substantially flat portion of the plenum has a threaded distal end for coupling to an external conduit or coupling.

Preferably, the substantially flat gasket comprises a compressible seal. In one form, the gasket comprises a polymeric sheet. Preferably, it is annular and or disk-like. Preferably, the gasket comprises a resilient material.

Preferably, the conduit rigidly connected to and extending upwardly from the substantially flat portion of the plenum is welded to the plenum.

Alternatively, instead of the plenum having a flat upper surface, the plenum can have a contoured surface. For example, the plenum can be curved. In one example form, the plenum can be cylindrical.

Optionally, the geomembrane can be sandwiched between an upper surface of the wellhead and a nut threaded onto the conduit extending up from the wellhead. Alternatively, a resilient gasket can be placed over the geomembrane, under the geomembrane, or one over and one under the geomembrane. Also, the geomembrane can be held in a generally flat configuration where it interacts with the wellhead or it can be forced to follow the contour of a non-flat wellhead.

BRIEF DESCRIPTION OF THE DRAWING FIGURES

DESCRIPTION OF EXAMPLE EMBODIMENTS

The present invention relates to a near-surface wellhead for extracting sub-surface gas and the like from near the surface of landfills using a geomembrane M for capping a waste field W. The geomembrane M is generally impermeable to contain or cap the waste below, thereby restricting the sub-surface gas from flowing into the atmosphere and restricting atmospheric air from flowing into the waste below the geomembrane M.

Figure 1:
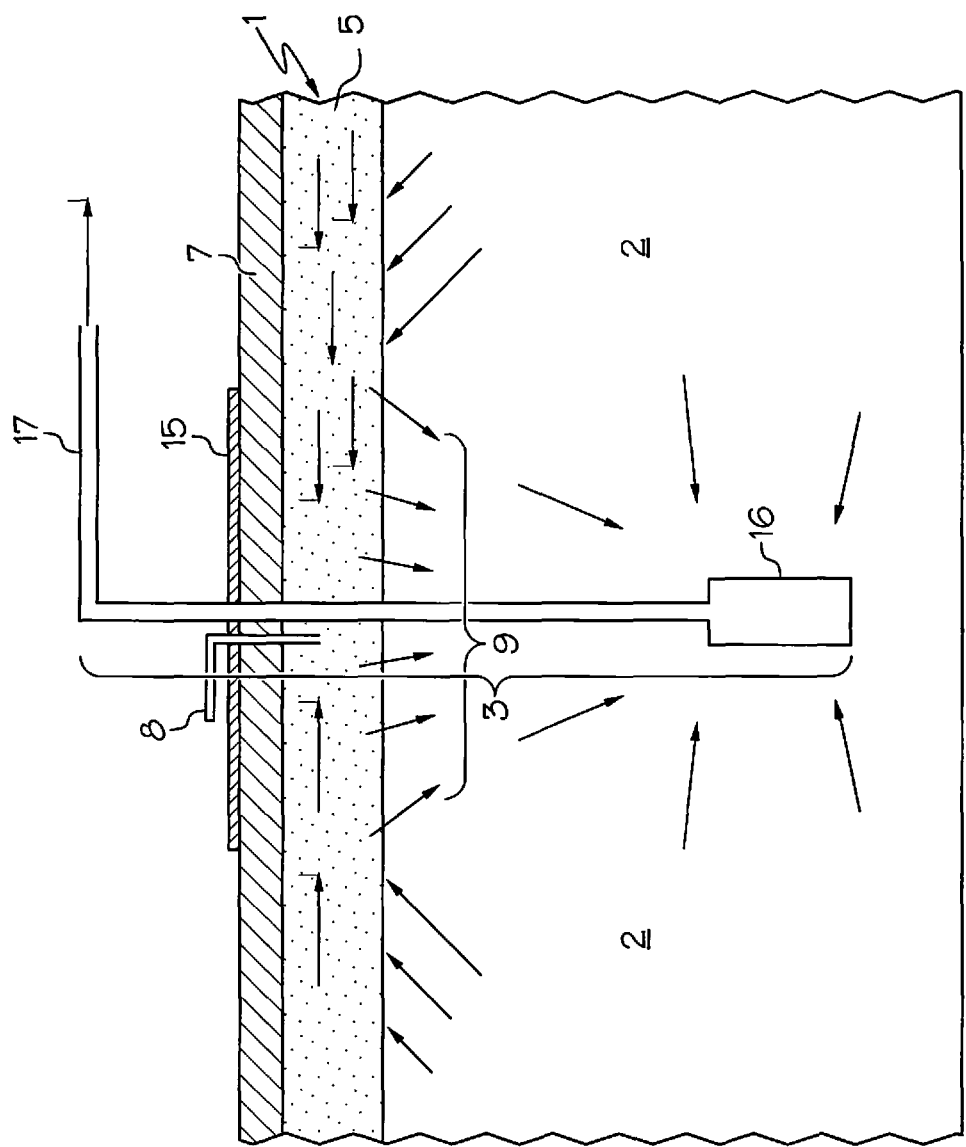
FIG. 1 is a schematic illustration of a first prior art wellhead for extracting sub-surface gas from a waste landfill.
Figure 2:
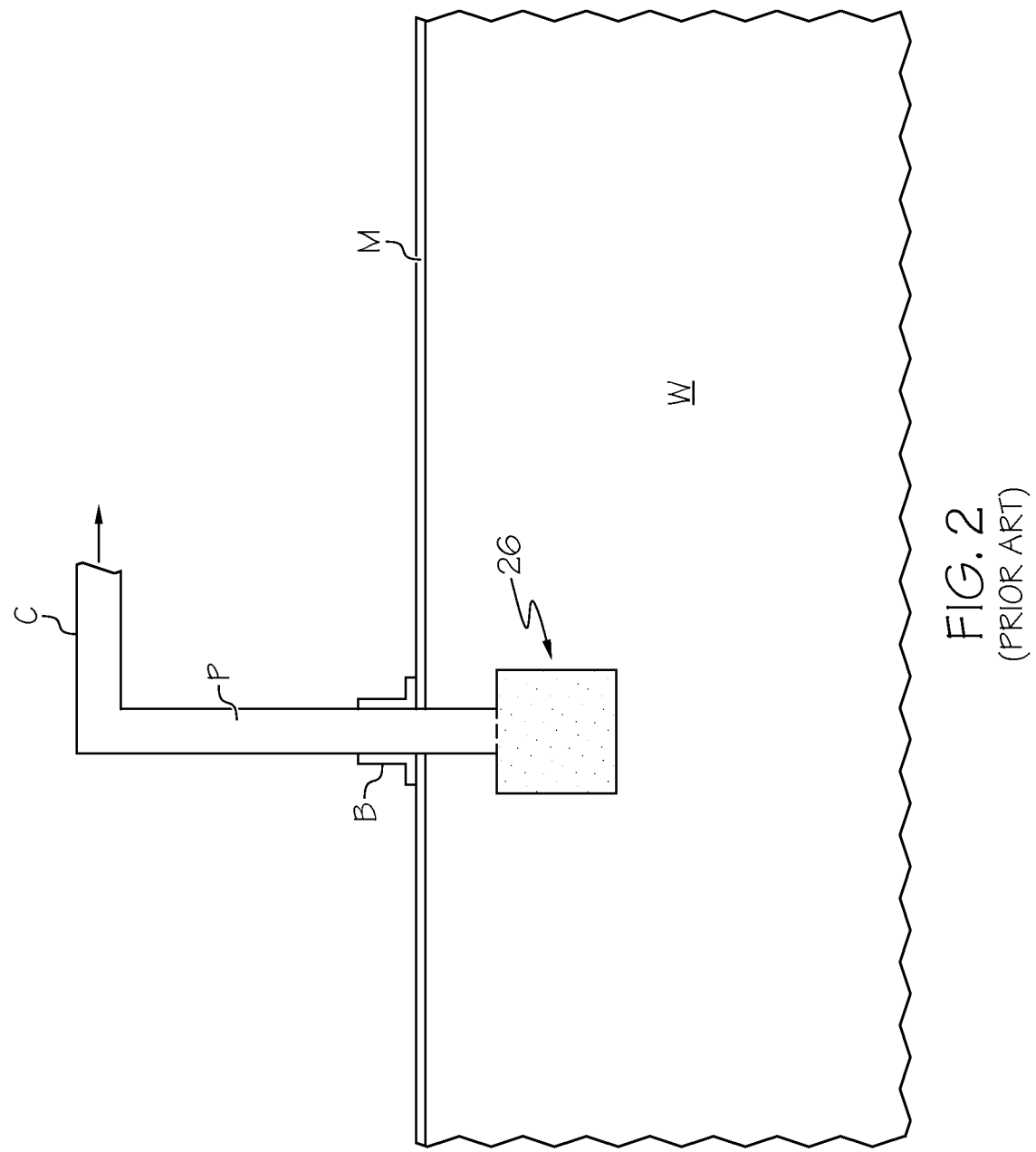
FIG. 2 is a schematic illustration of a second prior art wellhead for extracting sub-surface gas from a waste landfill.
Figure 3:
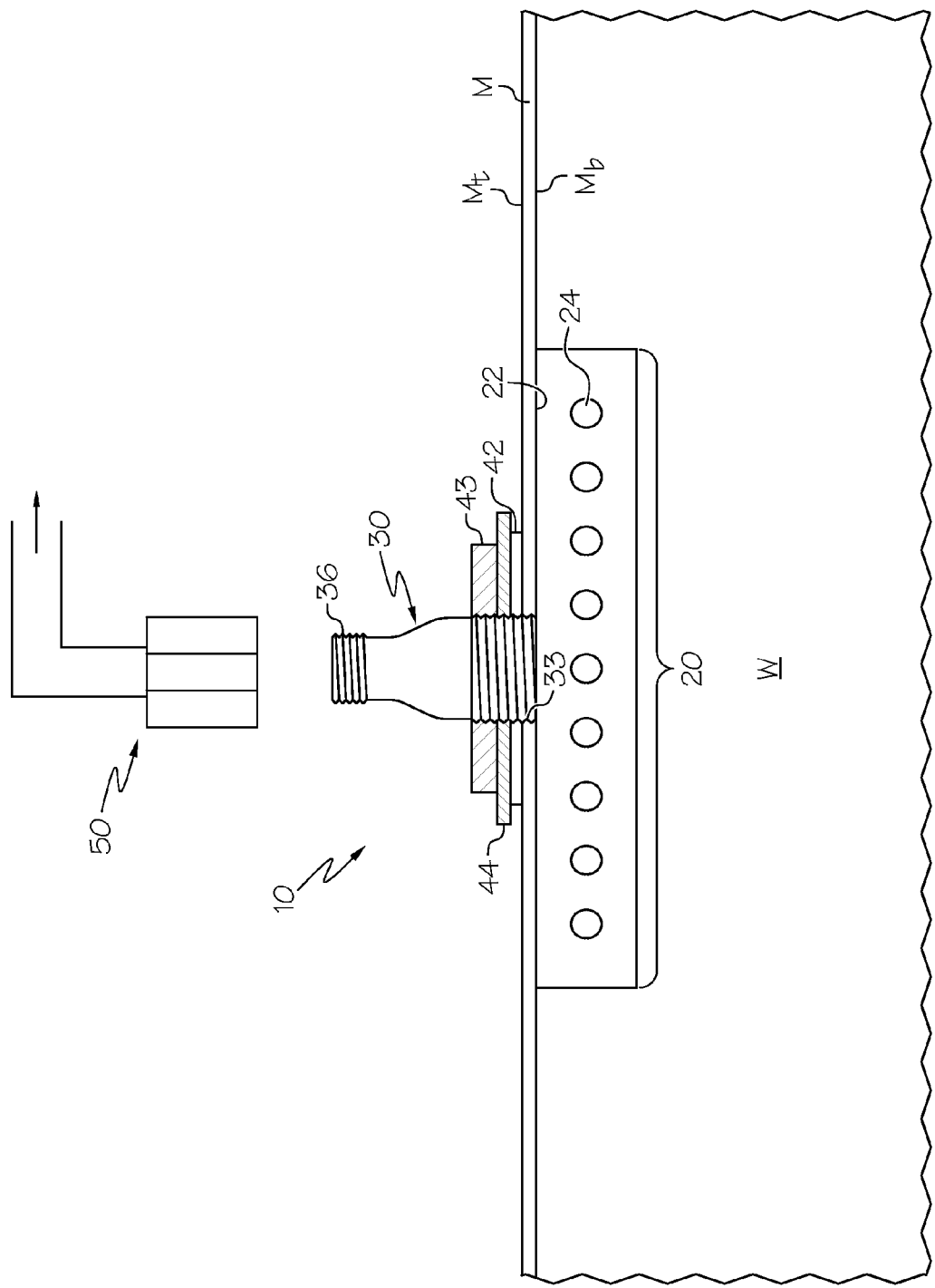
FIG. 3 is a schematic, partially-exploded sectional view of a wellhead for extracting sub-surface gas from a waste landfill according to a preferred example form of the present invention.

FIG. 3 is a schematic, partially-exploded sectional view of the wellhead 10 for extracting sub-surface gas from a waste landfill according to a preferred example embodiment of the present invention. The wellhead 10 includes a generally box-like plenum 20 having an enclosure with a substantially flat upper portion 22 defining an interior volume, and perforations 24 are formed in the plenum to provide for the admission of sub-surface gas into the interior volume. When the wellhead 10 is mounted adjacent the geomembrane M, the plenum 20 sits close below the geomembrane M proximal the waste W, allowing the substantially flat upper portion 22 of the plenum 20 to contact a bottom surface Mb of the geomembrane M. A threaded conduit 30 extends upwardly from the substantially flat upper portion 22 and communicates with the interior volume of the plenum 20 and preferably is rigidly connected to the plenum by welding. For example, see weld 33 extending along the outer contour of the conduit 30 in contact with the substantially flat upper portion 22 (see FIG. 4). Optionally, the conduit 30 can be integrally formed with the plenum. Also, the conduit can have coupling features for mounting to the geomembrane M.

The conduit 30 extends through a central opening of a flat gasket 42 so that the geomembrane M is sandwiched between the flat gasket 42 and the substantially flat upper portion 22 of the plenum 20. Preferably, the flat gasket 42 is formed from a resilient material for providing a compressible seal. In one form, the flat gasket 42 comprises a polymeric sheet having an annular and/or disc-like shape. Alternatively, the flat gasket 42 can be shaped as desired and can comprise other available materials. Optionally, a second flat gasket can be provided such that the geomembrane M is positioned between the two gaskets.

A threaded nut 43 engages external threads 35 of the conduit 30 above the flat gasket 42 and secures the flat gasket 42 against the geomembrane M, thus sealing the geomembrane M to the substantially flat upper portion 22 of the plenum 20. Optionally, a large flat washer 44 is positioned between the threaded nut 43 and the gasket to provide a uniform clamping force and to avoid galling the flat gasket 42 as the threaded nut 43 is tightened (see FIG. 4).

Optionally, the conduit 30 has external threads 36 at a distal end for coupling to an external conduit or coupling 50. Optionally, other forms of coupling features may be provided for mounting the wellhead 10 to the geomembrane M and to the optional external conduit 50. For example, pins, bolts, clamping mechanisms, or other available coupling features can be employed.

Figure 4:
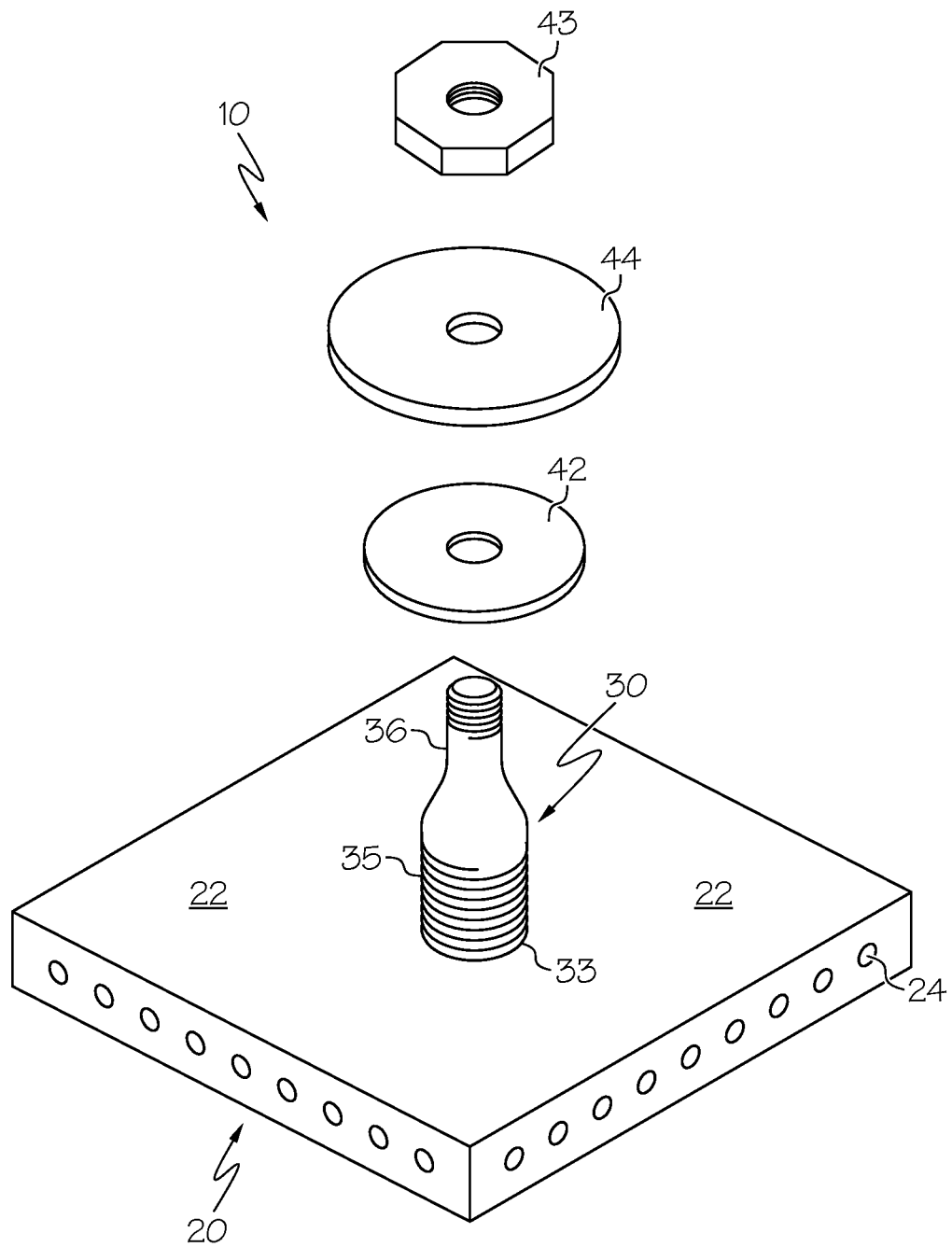
FIG. 4 is a schematic partially-exploded perspective view of the wellhead of FIG. 3.

FIG. 4 shows a partially-exploded perspective of the near-surface wellhead 10 as described above. In commercial embodiments, the near-surface wellhead 10 can be constructed from metals, durable plastics or other materials suitable for sealingly engaging the geomembrane and allowing the admission of natural gas within the interior volume and the conduit 30. Preferably, the plenum 20 and the conduit 30 are constructed of materials suitable for welding together, for example, steel, aluminum or other available materials. Preferably, the threaded nut 43 and the optional flat washer 44 are formed from metal or other material suitable for engaging the conduit 30 and sealing the geomembrane M to the substantially flat upper portion 22. Preferably, the perforations 24 formed with the plenum 20 can be shaped and sized as desired. The external conduit or coupling 50 can be formed from metals, plastics or other available materials.

Preferably, the portions of the wellhead 10 contacting the bottom and top surfaces Mb, Mt of the geomembrane M (flat gasket 42 contacting top surface Mt and flat upper portion 22 of the plenum 20 contacting bottom surface Mb) are generally flat and have smooth surfaces to provide a uniform clamping force and effective sealing of the geomembrane M to the substantially flat upper portion 22. Optionally, the portions of the wellhead 10 contacting the geomembrane M can have textured surfaces. For example, the substantially flat upper portion 22 (or other portion of the wellhead 10 contacting the geomembrane M) can comprise a plurality of concentric rings defining a plurality of contact surfaces for improving the seal between the wellhead 10 and the geomembrane M. Preferably, the one or more textured surfaces contacting the geomembrane M are configured to provide additional contact and sealing capabilities.

In further example embodiments, the plenum can be shaped as desired. Preferably, when the plenum comprises a contoured or non-planar surface, a mounting medium or clamping element, having a portion contoured to match the shaped surface of the plenum, can be positioned proximal to the top or bottom portion Mt, Mb of the geomembrane M to provide a uniform clamping force and effective sealing of the geomembrane to the plenum.

Figure 5:
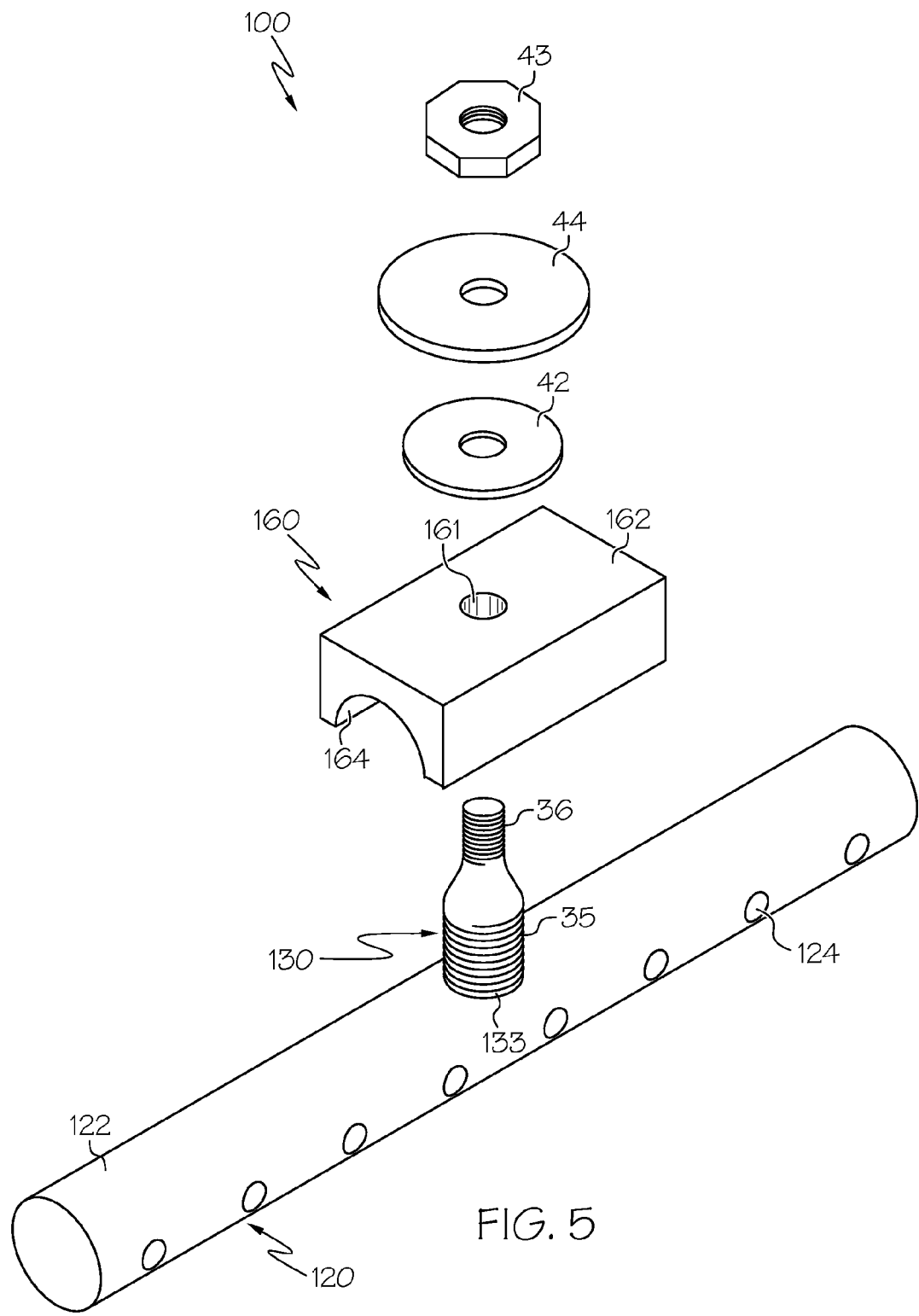
FIG. 5 is a schematic, partially-exploded sectional view of a wellhead for extracting sub-surface gas from a waste landfill according to a second preferred example form of the present invention.

For example, as depicted in FIG. 5, a near-surface wellhead 100 includes a pipe-like plenum 120 having an enclosure with a substantially curved surface 122 defining an interior volume. Preferably, the conduit 130 is rigidly mounted to the plenum 120 (see weld 133) and communicates with the interior volume of the plenum 120. Also, perforations 124 are formed in the plenum 120 to provide for the admission of sub-surface gas into the interior volume. To provide a uniform clamping force for sealing the geomembrane M to the plenum 120, a mounting clamp or boss 160 is positioned between the bottom portion Mb of the geomembrane M and the curved surface 122 of the plenum 120. The mounting clamp 160 generally includes a substantially flat upper portion 162 for contact with the bottom portion Mb, a substantially contoured lower portion 164 corresponding to the curved surface 122 of the plenum 120, and a central opening 161 for allowing the conduit 130 to extend therethrough. Preferably, at least some of the perforations 124 in the plenum 120 are positioned to remain uncovered by the contoured surface 164 of the mounting medium 160 when the wellhead 100 is mounted to the geomembrane M.

Figure 6A:
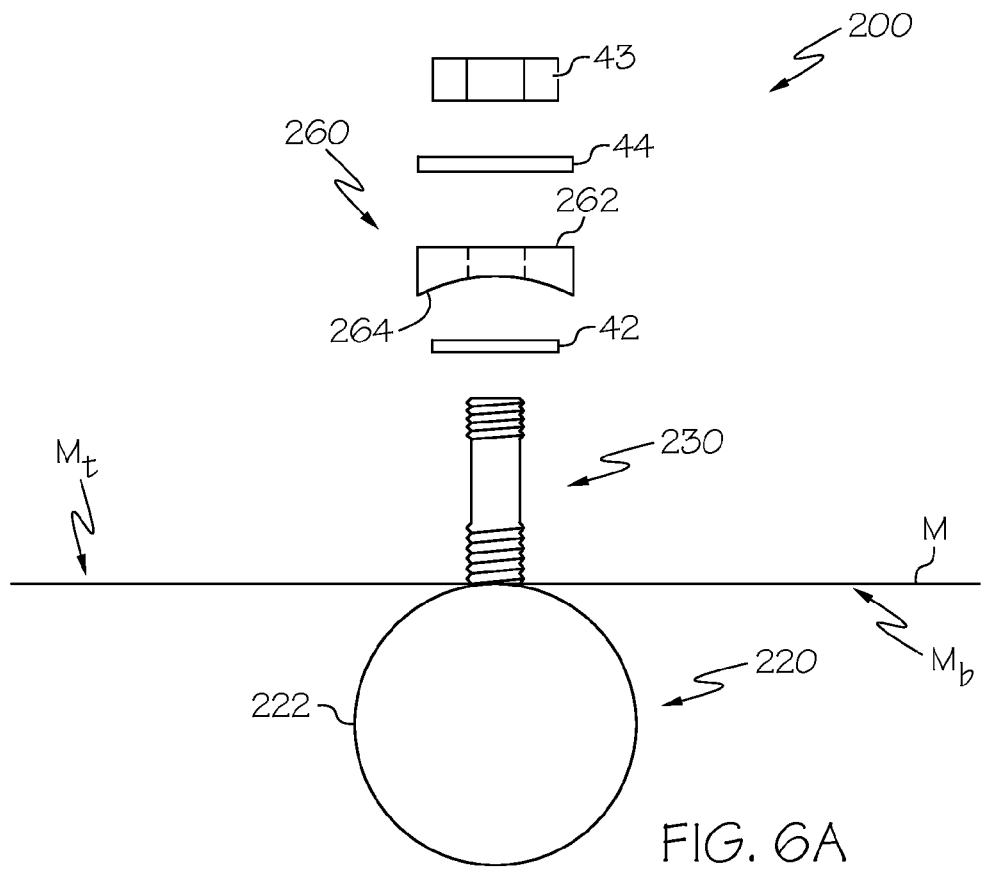
FIGS. 6A and 6B are schematic, partially-exploded sectional views of a wellhead for extracting sub-surface gas from a waste landfill according to a third preferred example form of the present invention.
Figure 6B:
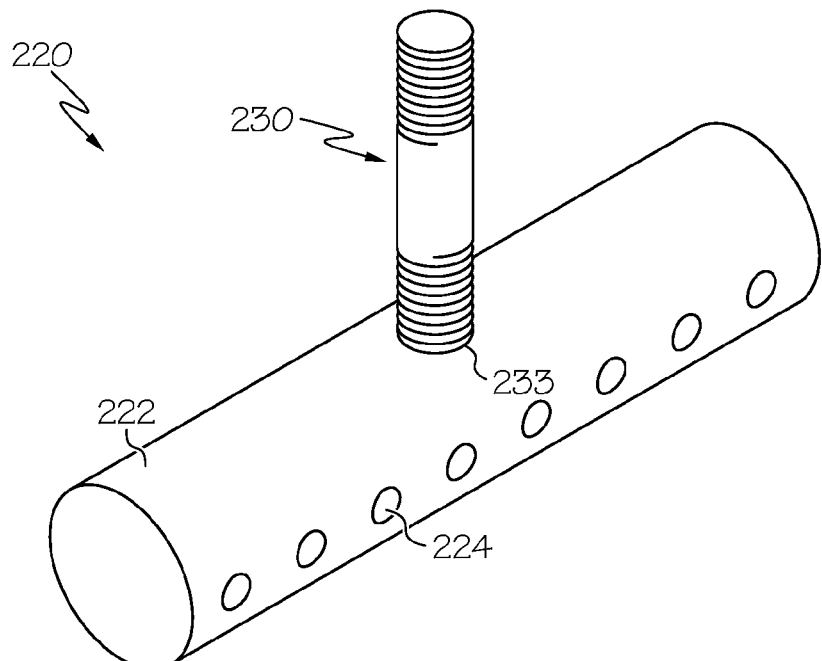

Further, as shown in FIGS. 6A-B, another optional design for a wellhead is depicted. Here, wellhead 200 includes a barrel-shaped plenum 220 having an enclosure with a substantially curved surface 222 defining an interior volume. The conduit 230 is rigidly mounted to the plenum 220 (see weld 233) and communicates with the interior volume of the plenum 220. Also, perforations 224 are formed in the plenum 220 to provide for the admission of natural gas into the interior volume. To provide a uniform clamping force for sealing the geomembrane M to the plenum 220, a clamping element 260 is positioned between the top portion Mt of the geomembrane M and the threaded nut 43, thereby allowing the geomembrane M positioned between a contoured portion 264 of the clamping element 260 and the curved surface 222 of the plenum 220 to conform to the contoured portions 222, 264 and remain sealingly engaged therebetween. The clamping element 260 generally includes the contoured lower portion 264 corresponding to the curved surface 222 of the plenum 220, a substantially flat upper portion 262 for contact with the threaded nut 43, and a central opening for allowing the conduit 230 to extend therethrough. Optionally, the flat gasket 42 can be positioned between the clamping element 260 and the geomembrane M and/or the flat washer 44 can be positioned between the flat portion 262 of the clamping element 260 and the threaded nut 43.

As shown herein and described above, the geomembrane can be sandwiched between an upper surface of the wellhead and a nut threaded onto the conduit extending up from the wellhead. Alternatively, a resilient gasket can be placed over the geomembrane, under the geomembrane, or one over and one under the geomembrane. Also, the geomembrane can be held in a generally flat configuration where it interacts with the wellhead (see FIGS. 3 and 4, for example) or it can be forced to follow the contour of a non-flat wellhead (see FIGS. 6A and 6B, for example). Moreover, while the upright conduit is shown and described as welded to the plenum, other attachments are possible. For example, it could be integrally formed with the plenum, threaded into the plenum, etc.

To install the wellhead, the wellhead is placed in the ground under where the geomembrane is (or is to be positioned), with the conduit extending vertically. An opening is made in the geomembrane and the geomembrane is placed over the conduit and above the wellhead. In this regard there are several ways to provide the opening in the membrane, such as cutting a single slit, cutting an X-shaped pair of slits, cutting a roughly circular hole, punching a hole, etc. After the geomembrane is placed over the conduit, the attachment thereto can be secured with the nut (and any optional washers/bosses, gaskets, etc., as described herein). Moreover, in those instances where it is desired to sandwich the geomembrane between two resilient gaskets, a first gasket is placed over the conduit before inserting the conduit up through the geomembrane.

The sub-surface gas to be collected and withdrawn with the present invention can be any of several sub-surface gases, such as natural gas.

It is to be understood that this invention is not limited to the specific devices, methods, conditions, or parameters described and/or shown herein, and that the terminology used herein is for the purpose of describing particular embodiments by way of example only. Thus, the terminology is intended to be broadly construed and is not intended to be limiting of the claimed invention. For example, as used in the specification including the appended claims, the singular forms "a," "an," and "one" include the plural, the term "or" means "and/or," and reference to a particular numerical value includes at least that particular value, unless the context clearly dictates otherwise. In addition, any methods described herein are not intended to be limited to the sequence of steps described but can be carried out in other sequences, unless expressly stated otherwise herein.

While the invention has been shown and described in exemplary forms, it will be apparent to those skilled in the art that many modifications, additions, and deletions can be made therein without departing from the spirit and scope of the invention as defined by the following claims.

What is claimed is:

1. A near-surface wellhead for extracting sub-surface gas from beneath a geomembrane covering at least a portion of a waste field, the wellhead comprising:
   a plenum for drawing in the sub-surface gas, the plenum comprising an enclosure with an upper portion, defining an interior volume, and including a plurality of perforations for admitting the sub-surface gas into the interior volume, with the perforations formed in the enclosure below the upper portion;
   a conduit rigidly connected to and extending upwardly from the upper portion of the plenum, the conduit communicating with the interior volume of the plenum, the conduit being adapted and provided for extending through an aperture in the geomembrane for withdrawing the drawn sub-surface gas from the interior volume of the plenum and through the geomembrane;
   a gasket having an opening formed therein that receives the conduit therethrough with the gasket positioned above and abutting against the geomembrane so that the geomembrane is sandwiched between the gasket and the upper portion of the plenum, wherein the plenum contacts the geomembrane along substantially an entire length of the upper portion of the plenum with the perforations positioned below the geomembrane; and
   a coupling for securing the gasket against the geomembrane to seal the geomembrane to the upper portion of the plenum along substantially the entire length of the upper portion of the plenum.

2. A near-surface wellhead for extracting sub-surface gas as claimed in claim 1 wherein the coupling comprises a threaded nut, and further comprising a substantially flat washer positioned between the threaded nut and the gasket.

3. A near-surface wellhead for extracting sub-surface gas as claimed in claim 1 wherein the plenum is generally box-like.

4. A near-surface wellhead for extracting sub-surface gas as claimed in claim 1 wherein the conduit rigidly connected to and extending upwardly from the substantially flat portion of the plenum comprises a threaded distal end for coupling to an external conduit or coupling.

5. A near-surface wellhead for extracting sub-surface gas as claimed in claim 1 wherein the gasket comprises a compressible seal.

6. A near-surface wellhead for extracting sub-surface gas as claimed in claim 1 wherein the gasket comprises a polymeric sheet.

7. A near-surface wellhead for extracting sub-surface gas as claimed in claim 1 wherein the gasket is annular.

8. A near-surface wellhead for extracting sub-surface gas as claimed in claim 1 wherein the gasket is disk-like.

9. A near-surface wellhead for extracting sub-surface gas as claimed in claim 1 wherein the conduit rigidly connected to and extending upwardly from the portion of the plenum is welded to the plenum.

10. A near-surface wellhead for extracting sub-surface gas as claimed in claim 1 wherein the gasket comprises a resilient material.

11. A near-surface wellhead for extracting sub-surface gas as claimed in claim 1 wherein the upper portion of the plenum is substantially flat.

12. A near-surface wellhead for extracting sub-surface gas from beneath a geomembrane covering a waste field, the wellhead comprising:
   a plenum for drawing in the sub-surface gas, the plenum defining an interior volume and having an upper surface, a lower surface, and one or more peripheral side surfaces extending between the upper surface and the lower surface, with the side surfaces defining perforations for admitting the drawn sub-surface gas into the interior volume of the plenum;
   a conduit rigidly connected to and extending upwardly from the upper surface of the plenum, the conduit communicating with the interior volume of the plenum, the conduit being adapted and provided for extending through an aperture in the geomembrane for withdrawing the drawn sub-surface gas from the interior volume of the plenum and through the geomembrane;
   a gasket having an opening formed therein that receives the conduit therethrough with the gasket positioned above and abutting against the geomembrane so that the geomembrane is sandwiched between the gasket and the upper surface of the plenum, wherein the plenum contacts the geomembrane along substantially an entire length of the upper surface of the plenum between the perforated side surfaces of the plenum so that the perforated side surfaces extend downward from the geomembrane; and
   a coupling for securing the gasket against the geomembrane to seal the geomembrane to the upper surface of the plenum along substantially the entire length of the upper surface of the plenum between the side surfaces of the plenum.

13. A near-surface wellhead for extracting sub-surface gas as claimed in claim 12 wherein the plenum is generally box-like and the upper surface is flat.

14. A near-surface wellhead for extracting sub-surface gas as claimed in claim 12 wherein the plenum is generally cylindrical and the upper surface is curved.

15. A near-surface wellhead for extracting sub-surface gas as claimed in claim 14 further comprising a clamping element with a lower surface having a curve that generally corresponds to the shape of the upper curved surface of the plenum.

16. A near-surface wellhead for extracting sub-surface gas as claimed in claim 12 wherein the gasket is annular.

17. A near-surface wellhead for extracting sub-surface gas as claimed in claim 12 wherein the gasket comprises a resilient material.

18. A near-surface wellhead for extracting sub-surface gas as claimed in claim 12 wherein the coupling includes external threads on the conduit and a threaded nut that fits over the external threads of the conduit and above the gasket.

19. A near-surface wellhead assembly for extracting sub-surface gas from beneath a waste field, the wellhead assembly comprising:
   a geomembrane covering the waste field;
   a plenum for drawing in the sub-surface gas, the plenum defining an interior volume and having an upper surface, a lower surface, and one or more peripheral side surfaces extending between the upper surface and the lower surface, with the side surfaces defining perforations for admitting the drawn sub-surface gas into the interior volume of the plenum;
   a conduit rigidly connected to and extending upwardly from the upper surface of the plenum, the conduit communicating with the interior volume of the plenum, the conduit being adapted and provided for extending through an aperture in the geomembrane for withdrawing the drawn sub-surface gas from the interior volume of the plenum and through the geomembrane;
   a gasket having an opening formed therein that receives the conduit therethrough with the gasket positioned above and abutting against the geomembrane so that the geomembrane is sandwiched between the gasket and the upper surface of the plenum, wherein the plenum contacts the geomembrane along substantially an entire length of the upper surface of the plenum between the perforated side surfaces of the plenum so that the perforated side surfaces extend downward from the geomembrane; and
   a coupling for securing the gasket against the geomembrane to seal the geomembrane to the upper surface of the plenum along substantially the entire length of the upper surface of the plenum between the side surfaces of the plenum,
   wherein in use the drawn sub-surface gas is drawn up to the geomembrane and laterally along the geomembrane, the seal of the entire upper surface of the plenum to the geomembrane prevents the sub-surface gas from passing over the plenum, and the side surfaces of the plenum extending downward from the geomembrane direct the drawn sub-surface gas into the perforations in the side surfaces of the plenum.

20. A near-surface wellhead for extracting sub-surface gas as claimed in claim 19 wherein the lower surface and the side surfaces of the plenum are buried in the waste field, positioned below the geomembrane, and positioned below grade of the waste field, and the upper surface of the plenum is not positioned below the grade of the waste field.

* * * * *